United States Patent [19]
Goto

[11] Patent Number: 5,362,929
[45] Date of Patent: Nov. 8, 1994

[54] WEIGHT SENSOR DEVICE

[75] Inventor: Hiroshi Goto, Yamatokoriyama, Japan

[73] Assignee: Omron Corporation, Kyoto, Japan

[21] Appl. No.: 935,101

[22] Filed: Aug. 27, 1992

[30] Foreign Application Priority Data

Aug. 29, 1991 [JP] Japan .................. 3-244378
Aug. 29, 1991 [JP] Japan .................. 3-244379

[51] Int. Cl.$^5$ .................. G01G 3/14; H01L 41/04
[52] U.S. Cl. .................. 177/210 FP; 310/338
[58] Field of Search .................. 177/210 FP

[56] References Cited

U.S. PATENT DOCUMENTS 4,050,530 9/1977 Storace .................. 177/210 FP X
4,697,657 10/1987 Portman Jr. et al. .................. 177/210 FP
4,773,493 9/1988 Goodier .................. 177/210 FP
5,095,764 3/1992 Saner .................. 177/210 FP X Primary Examiner—George H. Miller, Jr.
Attorney, Agent, or Firm—Foley & Lardner

[57] ABSTRACT

A weight measuring device includes two piezoelectric elements. The first piezoelectric element induces vibration in an object to be measured, and the second one detects the reaction force of the object generated by the vibration. This force is detected by a voltage monitor circuit as an output voltage from the second piezoelectric element. From the voltage which has been detected, the weight of object is determined. The device further includes an absorbing element to absorb unnecessary piezoelectric strain in reaction force generated when the object vibrates. The invention provides a compact weight sensor which can be produced at low cost, and which can measure weight with high accuracy.

7 Claims, 3 Drawing Sheets

WEIGHT SENSOR DEVICE

FIELD OF THE INVENTION

This invention relates to a weight sensor device which measures the weight of an object. More specifically, the invention relates to a compact weight sensor which uses piezoelectric elements.

BACKGROUND OF THE INVENTION

The weight sensor shown in FIG. 10, which makes use of the deflection of a spring, is an example of a sensor device to measure the weight of an object. This weight sensor device includes, (i) table 1, which supports the object to be weighed (not illustrated), (ii) springs 2, one end of each of which is fixed to the main body of the device and the other end of which is attached to the bottom of table 1, and (iii) detector 3, which measures how much springs 2 have been displaced by the load placed on table 1. A common choice for detector 3 is an overcurrent detector including coil 4, which is fixed to the bottom of table 1, and electromagnet 6, which surrounds coil 4 and is fixed to base 5.

The type of weight sensor described above operates on the principle that the displacement of springs 2 is proportional to the load of the object to be measured. The displacement of springs 2 can be measured by detecting the change in the relative positions of coil 4 and electromagnet 6 by means of changes in the current which are induced in coil 4.

However a weight sensor device of the type described above utilizes a large number of components. Thus the device itself must be relatively large, and production is costly. Weight sensor devices to be used in home appliances, such as electronic ranges, must be particularly compact and economical. The type of sensor device described above, then, is non-optimal for this application.

In view of the circumstances described above, the objective of the present invention seeks to provide a weight sensor which is compact and economical.

SUMMARY OF THE INVENTION

The weight sensor of this invention has a piezoelectric element resting on a base; another piezoelectric element fixed to the first element in a coaxial fashion; a drive device which vibrates one of the two aforesaid piezoelectric elements and so induces periodic vibration in an object whose weight is to be measured; and a device which detects, by means of the output voltage from the other piezoelectric element, the reaction force generated in the aforesaid object when vibration is induced.

In a weight sensor with the structure described above, periodic vibration is induced in an object whose weight is to be measured when one of the piezoelectric elements is driven by a drive device. The reaction force of the object is converted to voltage by the other piezoelectric element, and this output voltage is detected by a device for that purpose. By means of this output voltage, the weight of the object can be measured. Thus the structure of the weight sensor is simplified, and a compact and economical sensor results.

Another aspect of the invention is to absorb the piezoelectric strain generated at a horizontal direction to the plane of vibration of the piezoelectric element driven by the drive device, so that the other piezoelectric element can detect only vertical reaction force.

This absorbing means can be realized by inserting a plate or small contact article between the two piezoelectric elements.

Thus this strain is not transmitted to the second piezoelectric sensor, which outputs a voltage proportional to the strain of the reaction force only. In this way the weight of the object can be measured with high accuracy.

BRIEF DESCRIPTION OF THE DRAWINGS

The above summarized invention is described with reference to the attached figures in which.

DETAILED DESCRIPTION OF THE PREFERRED EMBODIMENTS

Figure 1:
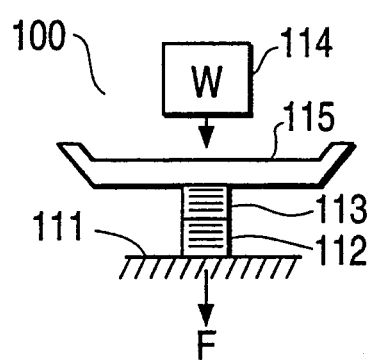
FIG. 1 shows a structure of a weight sensor device in which this invention has been implemented.
Figure 2:
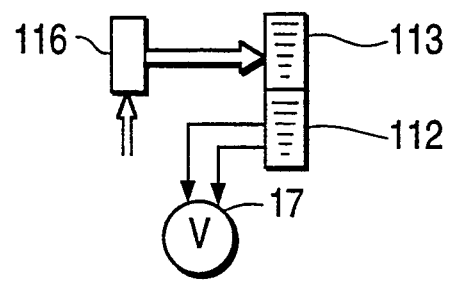
FIG. 2 is a functional block diagram of the weight sensor device in FIG. 1.

FIGS. 1 and 2 show the structure of an embodiment of this invention. In the weight sensor device, shown generally at 100 in FIG. 1, piezoelectric element 112 rests on base 111, and piezoelectric element 113 is fixed to element 112 in a coaxial fashion. On top of piezoelectric element 113 is mounted table 115, on which the object whose weight is to be measured is placed. As shown in FIG. 2, oscillator circuit 116, which is the drive device, is connected to piezoelectric element 113. By applying a voltage to the oscillator circuit 116, the drive circuit causes piezoelectric element 113 and table 115 to vibrate at a given frequency vertically. Voltage monitor circuit 17, which detects the reaction force generated in object 114 by the vibration induced by piezoelectric element 113, is connected to piezoelectric element 112.

When the piezoelectric element receives force from the exterior at a vertical direction with respect to its electrodes, it undergoes internal polarization. As a result, voltage is generated which can be applied to an acceleration sensor or the like. However, when a piezoelectric element is used to detect a static force such as weight, there will be internal loss in the element, and it will not be possible to achieve stable output voltage.

However, the output voltage characteristics depend on the frequency of the force applied to the piezoelectric element. Thus, if a small piezoelectric element is to be used to detect weight, it will be necessary to apply excitation to the element in the form of an AC current.

Figure 3A:
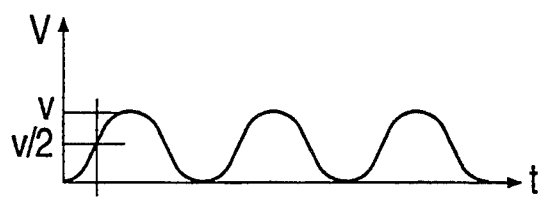
FIG. 3(a) shows an AC voltage applied to one of the piezoelectric elements.
Figure 3B:
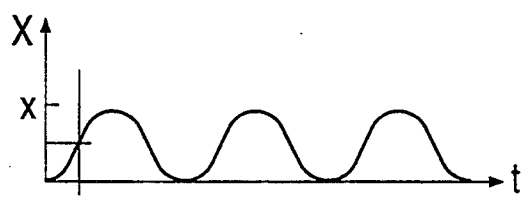
FIG. 3(b) shows displacement of a table resulting from application of an AC voltage to the piezoelectric element shown in FIG. 3(a)

An AC voltage v is applied to piezoelectric element 113, as shown in FIG. 3(a). Vibration of frequency ω is induced in table 115. As a result, piezoelectric element 113 causes table 115 to undergo displacement x, as shown in FIG. 3(b). The displacement X can be expressed by the following formula.

$$X = (x/2) \sin \omega t + x/2 \quad (1)$$

Where x is the amplitude of displacement from the vibration of table 15.

In this situation, the acceleration a experienced by table 115 when it has on it an object 15 of weight w can be expressed by the following formula after differentiating twice.

$$a = -(x/2)\omega^2 \sin \omega t \quad (2)$$

Figure 3C:
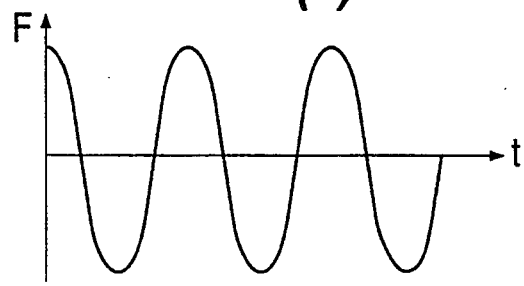
FIG. 3(c) shows the reaction force.

The waveform of the reaction force F which is applied to base 11 and also to piezoelectric element 12 by above acceleration a is shown in FIG. 3(c). Its magnitude can be expressed by the following formula.

$$F = (w/g) \cdot a = (w/g)((-x/2)\omega^2) \cdot \sin \omega t \quad (3)$$

If the frequency w and the amplitude x are held constant, the reaction force F can be expressed as a temporal function of the weight W. Thus, the reaction force F applied to piezoelectric element 112 will vary proportionally with the weight W; and the voltage value $V_n$ output by piezoelectric element 112 will also vary. By monitoring this voltage, we can measure the weight W. That is to say, $V_n$ is directly proportional to W.

The principle given above can be used in a weight sensor device structured as shown in FIGS. 1 and 2. By measuring the voltage output by voltage monitor circuit 117, the weight W of object 14 can be obtained.

The weight sensor of this invention is constructed of two piezoelectric elements, 112 and 113. It has a simple configuration, it is compact and light, and it costs less than its predecessors.

As can be seen in Equation (3), if the amplitude x is set at a higher value, the detection response will improve. This being the case, it would be desirable to use a multi-layer-type element for piezoelectric element 113, as this sort of element is capable of a large displacement at a low voltage.

Figure 4:
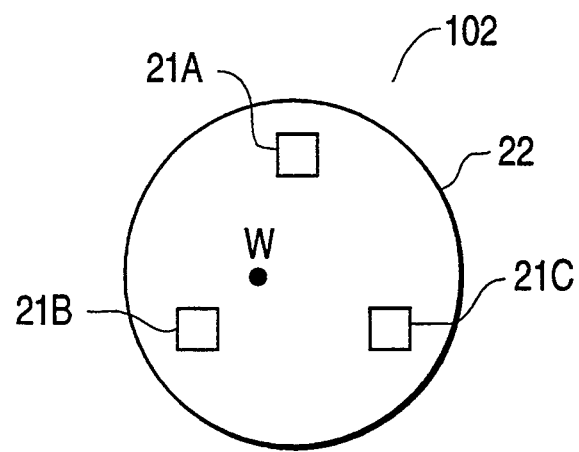
FIG. 4 shows another type of weight sensor device in which this invention has been implemented.
Figure 5:
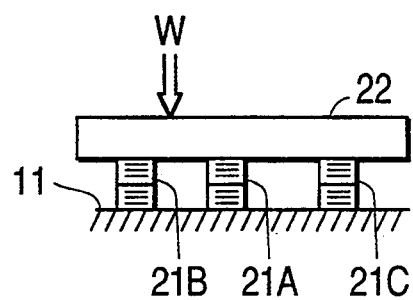
FIG. 5 is a frontal view of the weight sensor device shown in FIG. 4.

As shown in FIGS. 4 and 5, a weight sensor device 102 with the structure described above can have three weight sensors 21A, 21B and 21C, which are mounted in three locations on a base 22. In this case, the load applied to each of sensors 21A, 21B and 21C will vary according to the position of the load W of object 14. We are thus able to obtain both the position of object 14 and its weight distribution. It is possible to use the individual voltages or a total value of the voltages to determine weight and from the individual voltages to determine weight distribution.

The above embodiment suggests one possible configuration for the weight sensor. Other configurations which apply the principles of this invention may also be used. For example, piezoelectric element 113, which serves to induce vibration, may be placed below piezoelectric element 112. The voltage may be monitored by piezoelectric element 112 at a fixed frequency, or the peak value may be read.

With reference to FIGS. 6–9, we shall explain other embodiments of the weight sensor device in which this invention has been implemented.

Figure 6:
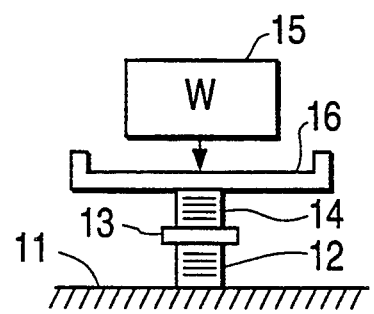
FIG. 6 shows a structure of another embodiment of the weight sensor device of this invention.

In FIG. 6, the first piezoelectric element 12 is supported by base 11. On top of piezoelectric element 12 is plate 13, a device to absorb strain. In one example, this plate could be formed from an aluminum plate with a thickness of approximately 5 mm. On top of plate 13 piezoelectric element 14 is fixed so that it is concentric with element 12. Table 16, on which the object to be weighed is placed, is mounted to the top of piezoelectric element 14. Piezoelectric element 14 is made to vibrate in a sinusoidal waveform by a drive device which is actually an oscillator circuit (not pictured), as previously described. Piezoelectric element 12 has a voltage monitor circuit (also not pictured) to detect output voltage, as also previously discussed. This output voltage is proportional to the reaction force of object 15, in which vibration has been induced by piezoelectric element 14.

Figure 7:
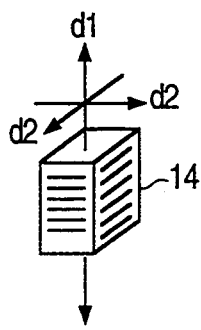
FIG. 7 shows directions in which strain is generated when a first piezoelectric element induces vibration in the object.

In the weight sensor shown in FIG. 6, assume that plate 13 is thin, and a single pair of piezoelectric elements, 12 and 14, are actually in direct contact with each other. As illustrated in FIG. 7, when piezoelectric element 14 is made to vibrate in direction $d_1$, contraction strain will be generated in that same element in direction $d_2$. This contraction strain, will be communicated to piezoelectric element 12 through its contacting surface, and element 12 will detect this strain, even if there is no object 15 on table 16. Thus, under conditions of no load, the voltage $V_1$ shown by the dotted line in FIG. 8 will be generated as output from piezoelectric element 12, which serves as a detector. Voltage $V_1$ decreases as the load increases and reaction force is applied in the direction which negates the contraction strain. From a voltage of 0V, the output again increases. Thus the output characteristics are non-linear, and it is difficult to accurately detect the reaction force.

Figure 8:
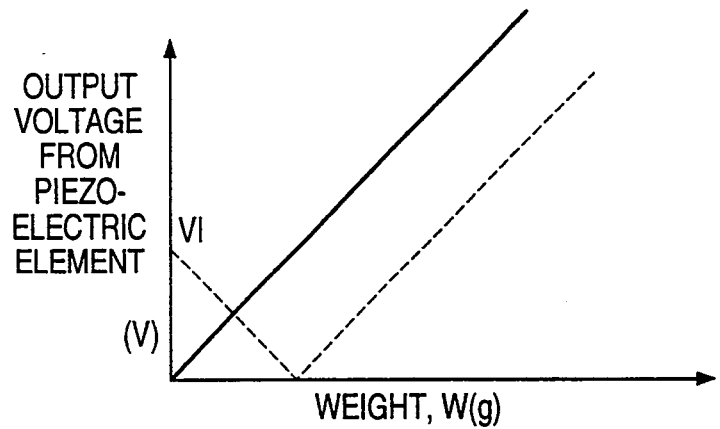
FIG. 8 the relationship between the weight of the object to be measured and the detected voltage.

It would be possible to set zero weight, as shown by the solid line in FIG. 8, by adding some certain weight to table 16. However, this is undesirable because the weight sensor device should be compact and light enough to install in small systems.

In a device utilizing this invention, therefore, the contraction strain generated in piezoelectric element 14 in direction $d_2$ is absorbed by the plate 13 which is sufficiently thick so as not to communicate with piezoelectric element 12. It has been experimentally determined that the contraction strain in direction $d_2$ can be adequately absorbed by fixing plate 13, which is, for example, an aluminum plate approximately 5 mm in thickness, between piezoelectric elements 12 and 14. Then when vibration has been induced in object 15, the only strain in direction $d_1$ generated in piezoelectric element 12 will be that due to the reaction force of the object, and a voltage proportional to this strain will be output. By detecting this output voltage, one can measure the weight W of object 15 with high accuracy. As shown by the solid line in FIG. 8, the relationship between detected voltage V and weight W remains linear.

The weight sensor incorporating this embodiment of the invention is constructed of two piezoelectric elements, 12 and 14. It has a simple configuration, it is compact and light, and it costs less than its predecessors. Because it has a plate 13, between piezoelectric elements 12 and 14 to absorb the contraction strain, the weight of object 15 can be measured with high accuracy.

Figure 9:
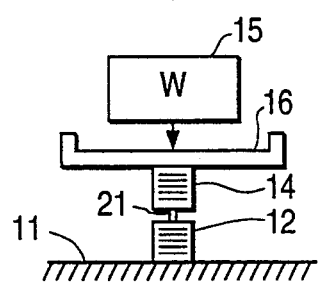
FIG. 9 shows a structure of another embodiment of the weight sensor of this invention.
Figure 10:
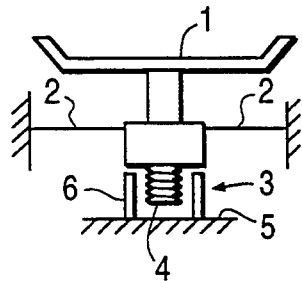
FIG. 10 shows a structure of one example of an existing weight sensor device.

In another embodiment, instead of plate 13 the spherical component 21 shown in FIG. 9 can be used to absorb the strain. In this case, piezoelectric elements 12 and 14 make contact through spherical component 21 at only one point, so the surface area which comes in contact with piezoelectric element 12 is extremely small. Such a spherical component can be a small ball or other component, such that the intersection of the component and the piezoelectric elements is over a small area, typically a single point, such as a pinpoint. This allows the transmission of the contraction strain to be reduced virtually to zero.

The above embodiment suggests one possible configuration for the weight sensor. Other configurations which apply the principles of this invention may also be used. For example, piezoelectric element 14, which serves to induce vibration, may be placed below piezoelectric element 12, which serves as the detector.

As was explained above, the weight sensor of this invention comprises two piezoelectric elements, one of which induces vibration in the object whose weight is to be measured. The reaction force of this object is obtained as output voltage the other piezoelectric element. Thus, this sensor has a simple structure, it is compact and light, and its cost is low. Because it has a device to absorb strain between the two piezoelectric elements, the contraction strain which occurs when vibration is induced is absorbed. Thus the weight of the object can be measured with high accuracy.

While specific embodiments of the invention have been described and illustrated, it will be clear that variations in the details of the embodiments specifically illustrated and described may be made without departing from the true spirit and scope of the invention as defined in the appended claims.

What is claimed is:

1. A weight sensor device, comprising:
   a table for receiving an object whose weight is to be measured;
   a first piezoelectric element connected with said table, said first piezoelectric element inducing periodic vibration in said object;
   a second piezoelectric element fixed to said first piezoelectric element in a coaxial fashion, said second piezoelectric element converting into voltage a reaction force generated when said object vibrates;
   an absorbing element between said first and second piezoelectric elements, said absorbing element absorbing a piezoelectric strain generated at a horizontal direction of said first piezoelectric element;
   a drive device driving said first piezoelectric element to induce said periodic vibration; and
   a device for detecting an output voltage from said second piezoelectric element.

2. A weight sensor device as in claim 1, wherein said absorbing element comprises a plate.

3. A weight sensor device as in claim 1, wherein said absorbing element has a pinpoint of intersection with each said piezoelectric element.

4. A weight sensor device as in claim 1, wherein said absorbing element comprises a spherical component.

5. A weight sensor device, comprising:
   a table for receiving an object whose weight is to be measured;
   a plurality of first piezoelectric elements connected with said table, said first piezoelectric elements inducing periodic vibration in said object;
   a second plurality of piezoelectric elements fixed to said first piezoelectric elements in a coaxial fashion, said second piezoelectric elements converting into voltage a reaction force generated when said object vibrates;
   an absorbing element between said first and second piezoelectric elements, said absorbing element absorbing a piezoelectric strain generated at a horizontal direction of said first piezoelectric element:
   a drive device driving said plurality of first piezoelectric elements; and
   a device for detecting values of output voltages from said second piezoelectric elements.

6. A weight measuring apparatus comprising:
   a pair of piezoelectric elements;
   an electrical stimulus connected to excite one element of said pair, thereby causing vibration of an object to be weighed, said vibration being communicated to the other element of said pair; and
   an absorbing element placed between said elements of said pair, said absorbing element absorbing piezoelectric strain generated in a direction different from a direction of force corresponding to the weight of said object;
   said other element producing a measurable electrical signal in response to said vibration, said measurable electrical signal being a measure of weight of said object.

7. A method of weighing an object, the method comprising the steps of:
   placing said object in communication with a pair of piezoelectric elements;
   applying an electrical stimulus to one of said piezoelectric elements thereby causing vibration of said object;
   absorbing in an absorbing element placed between said piezoelectric elements of said pair, piezoelectric strain generated in a direction different from a direction of force corresponding to the weight of said object; and
   measuring an electrical signal induced in the other piezoelectric element of said pair by a reactive force of said object generated in response to said vibration, said electrical signal representing a weight of said object.

* * * * *